Nov. 18, 1958     E. DANILOW     2,860,415
LAYOUT GAGE
Filed Sept. 13, 1956
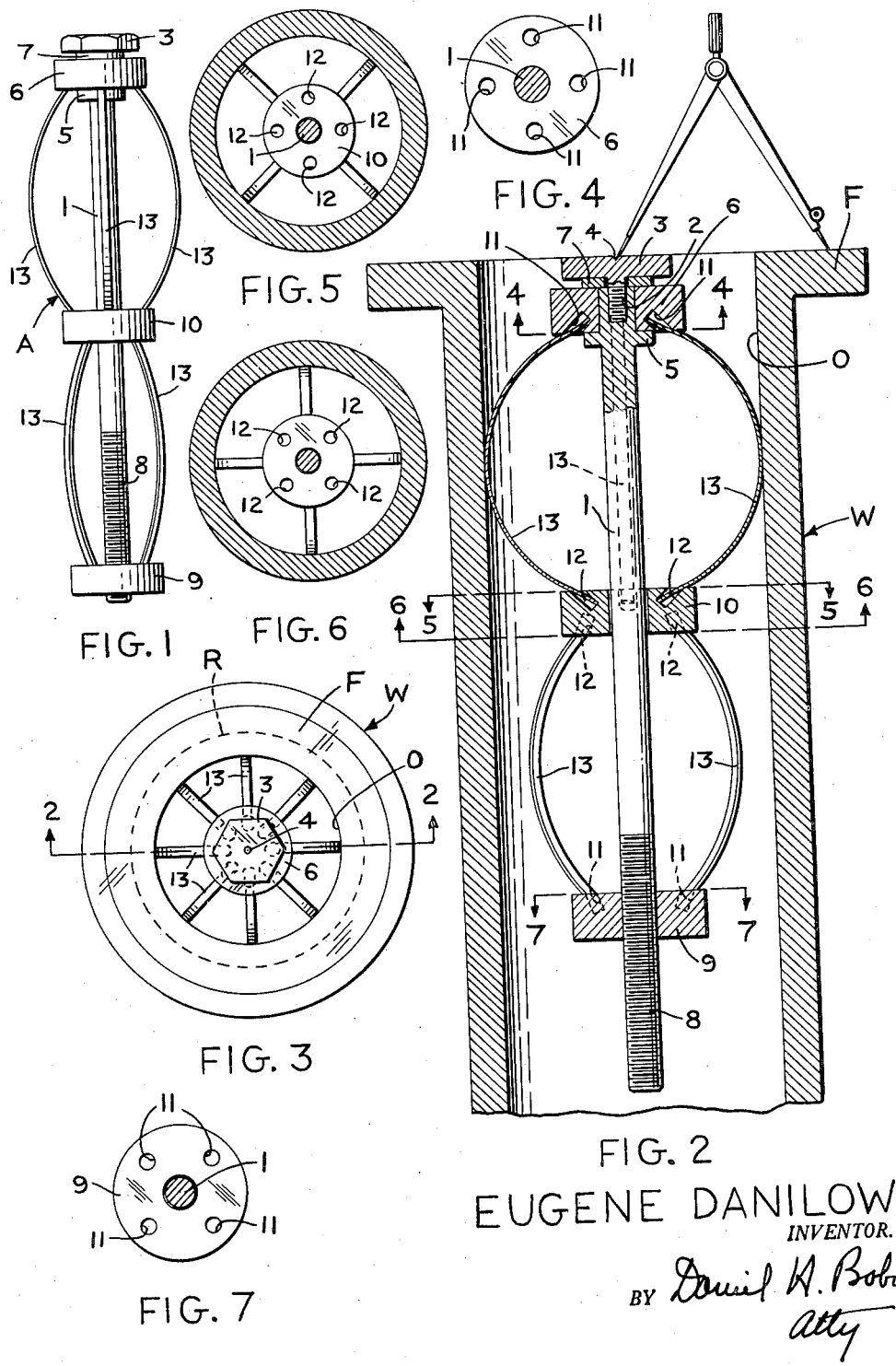
EUGENE DANILOW
INVENTOR.
BY Daniel H. Bobis
atty United States Patent Office 2,860,415
Patented Nov. 18, 1958

2,860,415
LAYOUT GAGE

Eugene Danilow, North Arlington, N. J.

Application September 13, 1956, Serial No. 609,598

4 Claims. (Cl. 33—1)

This invention relates generally to a measuring instrument and more particularly to a layout gage for drawing a definite radius on a member where the center for such radius is disposed in an opening or like cavity in the member.

Certain parts or elements for an engine, pump, compressor or other heavy machinery have openings therein about which or in relation to which it is often necessary to draw a definite radius or locate points on a definite radius.

Where the center or reference point is located in the plane of the opening, this becomes a difficult problem. Heretofore it has been necessary to obtain such center through a series of preliminary operations such as filling and leveling a wooden block or plug in the opening of the particular part and then finding the center on such wooden plug through the use of a surface gauge and scale.

The present invention overcomes this problem by providing a gage to fit into the opening including a rod-like element having spaced resilient elements adapted to be placed into releasable engagement with the walls of said opening so as to center a reference point one end of the rod-like element in the plane of the surface about the opening in which the gage is removably mounted.

Accordingly it is an object of the present invention to provide a layout gage for locating a reference point in an opening, in the plane of the surface about such opening whereby a radius or other measurement can be performed relative to the opening.

The invention will be better understood from the following description when considered in connection with the accompanying drawings forming a part thereof and in which:

Figure 1 is a side elevation showing the invention.

Figure 2 is a vertical section of the invention showing the layout gage in assembled position in a work piece.

Figure 3 is a top view showing the invention is assembled position in the work piece.

Figure 4 is a view taken at 4—4 on Figure 2 showing the upper roller element.

Figure 5 is a view taken at 5—5 on Figure 2 showing the intermediate roller element.

Figure 6 is a view taken at 6—6 on Figure 2 showing another view of the intermediate roller element.

Figure 7 is a view taken at 7—7 on Figure 2 showing the lower roller element.

Referring to the drawings Figures 1 and 2 show the layout gage generally designated A having an elongated centrally disposed rod-like element or member 1 with a threaded bore 2 at one end to provide means for connecting a head or cap member 3 so that rotation of the cap member 3 as hereinafter described will cause the rod to be rotated therewith. While the head or cap member 3 is shown as having a hexagonal shape it will be understood that it may be square or have some other suitable shape or configuration without departing from the spirit of the present invention.

The head or cap member has a fixed center point 4 clearly shown in Figure 3 of the drawings to provide the reference point from which the desired radius or measurement can be made.

Inwardly of the head or cap member 3 a collar 5 is formed about the member 1 to provide means for rotatably mounting a first or upper roller element 6. The roller element 6 is held by a washer 7 and hexagonal head 3 as is clearly shown in Figure 2 of the drawings, but any suitable form of lubrication may be utilized to allow this member to rotate freely about an axis transverse to the axis of the rod member 1.

The end of the rod-like member 1 remote from the head or cap member 3 is threaded as at 8 to threadably receive thereon a second or lower roller element 9. When the rod-like member is rotated by turning the head 3 if the roller 9 is prevented from rotating it will move along the threaded portion of the rod in one direction on clockwise rotation of the head element 3 and in the other direction on counterclockwise rotation of the head element 3.

Intermediate or medially spaced from the rollers 6 and 9 respectively, a third roller 10 is slidably and rotatably mounted on the rod-like member 1.

As is clearly shown in Figure 2 of the drawings the first or upper roller 6 and the second or lower roller 9 are provided with a plurality of circumferentially disposed bores struck at a forty-five degree angle in the respective faces of the rollers 6 and 9 adjacent or facing the intermediate roller. These bores on the respective roller elements 6 and 9 however, as is clearly indicated in Figures 4 and 7 are off-set from each other for purposes hereinafter set forth.

The intermediate or center roller 10 also has bores 12 struck at a forty-five degree angle on both faces as is indicated in Figures 2, 5 and 6 of the drawings. The bores 12 in the face adjacent the roller element 6 are in alignment with the respective bores 11 on this element and the bores 12 in the intermediate roller face adjacent the roller element 9 are in line with the respective bores 11 on the roller element 9. This construction permits for mounting a plurality of resilient elements or strips 13 such that each element or strip 13 will have one end in a bore 12 of the intermediate roller 10 and the other end in a bore 11 in the adjacent face of either the upper roller 6 or lower roller 9 as the case may be.

The resilient elements or strips 13 will all be the same length so that uniform action will occur when the strips are placed under compression. It will be understood that the respective sizes of the elements or strips 13 will vary depending upon the size of the opening in which the layout gage is to be utilized.

In assembled position the resilient elements 13 may be placed under slight compression as is shown in Figure 1 of the drawings by rotating the rod-like member 1 while holding the lower roller element 9. This operation causes the roller element 9 to thread towards the head or cap member 3 thereby asserting force on both the resilient elements 13 and the intermediate element 10 connected thereto as above described. Since the intermediate member is slidable, the relative forces on the resilient elements 13 between the roller 9 and roller 10 and roller 10 and roller 6 will equalize themselves automatically.

Operation

The operation of the layout gage A is described with reference to a work piece generally designated W having an opening O and a flange F about this opening on which a radius R or points on a radius must be located.

Thus the layout gage is held so that the second or lower roller 9 is prevented from rotating while the head element 3 is rotated in a direction to cause the member 9 to move axially towards the head or cap element 3. The result of this rotation is to cause the resilient strips or elements 13 to compress or bow outwardly, equalization of the forces between the respective resilient strips on opposite sides of the roller 10 being effected by reason of the slidable character of this member 10 on the rod 1. The rotation of member 3 is continued until the resilient strips have bowed out to the approximate size of the opening O.

When the strips are thus bowed outwardly the layout gage will then be placed into the opening and the rotation of member 3 continued. The member 3 is held in a position such that the upper surface is on a plane with the flange F of the work piece. When the layout gage is in engagement but still easily slidable in the opening O the surface of the head element 3 having the reference or center point 4 is checked as with a straight edge or level to be certain that it is in the plane of the flange F or other portion of the work piece about the opening. Thereafter the head or cap member 3 is tightened an additional number of turns to firmly engage the layout gage in position.

After the layout gage is so positioned the reference point or center may be used as is indicated in Figure 2 of the drawings, to draw a circle of radius R as indicated by the dotted line in Figure 3 of the drawings.

To remove the layout gage the head or cap member 3 is rotated in the reverse direction until the resilient strips expand sufficiently to release the layout gage from engagement with the walls of the opening O. The unit may then be lifted or slid from the opening without further difficulty.

It will be understood that the invention is not to be limited to the specific construction or arrangement of parts shown but that they may be widely modified within the invention defined by the claims.

What is claimed is:

1. In a layout gauge for a part having an opening therein comprising, an elongated rod-like member having a reference center in one end and a threaded portion in the other end, a roller rotatably disposed on said rod-like member, said roller having a fixed axial position relative to said rod-like member near said reference center in the one end, at least one roller axially slidably disposed on said rod-like member intermediate said fixed roller and said threaded end of the rod-like member, an additional roller threadably mounted on said threaded end of said rod-like member, and a plurality of circumferentially spaced resilient elements connected between said threadably mounted roller and said axially slidable roller and said axially slidable roller and said fixed roller, whereby rotation of the rod-like member moves the threadably mounted roller and thus also the axially slidable roller towards the fixed roller to cause the resilient elements to bow outwardly and center said layout gauge in said opening.

2. In the layout gauge as claimed in claim 1 wherein the axially slidable roller has bores in its top and bottom surfaces inclined in the direction of the rod-like member and preferably struck at an angle of forty-five degrees in which the ends of the resilient elements are disposed, which angle enhances the bowing of the said resilient elements.

3. In the layout gauge having the bores as claimed in claim 2 wherein the said bores are additionally in offset relationship to each other to impart this like relationship to the resilient elements to thereby insure proper centering of the layout gauge in the opening.

4. In a layout gauge for a part having an opening therein comprising, an elongated rod-like member, an annular shoulder inwardly of one end of said rod-like member, a roller element rotatively mounted on said rod-like member in abutment with said shoulder, and a head element on said one end to hold said roller in position having a reference center thereon, said rod-like member threaded at the end remote from said one end, a second roller threadably mounted on said threaded end of the rod-like member, a third roller slidably disposed on said rod-like member intermediate the first and second rollers, and a plurality of resilient strips connected between said rollers adapted to be bowed outwardly on rotation of said head element in one direction and elongated on rotation of the head element in the opposite direction whereby said layout gauge may be mounted in the opening of said part.

References Cited in the file of this patent
UNITED STATES PATENTS

| | | |
|---|---|---|
| 346,048 | Humphrey | July 20, 1886 |
| 967,175 | Demarchi | Aug. 16, 1910 |
| 2,114,228 | Maples | Apr. 12, 1938 |
| 2,502,775 | Brandon | Apr. 4, 1950 |
| 2,626,811 | Hohwart et al. | Jan. 27, 1953 |
| 2,630,632 | Brandon | Mar. 10, 1953 |
| 2,639,512 | Legrand | May 26, 1953 |
| 2,654,435 | Oliver | Oct. 6, 1953 |